United States Patent
Wu

(10) Patent No.: US 6,764,056 B1
(45) Date of Patent: Jul. 20, 2004

(54) REARVIEW MIRROR STRUCTURE

(76) Inventor: Shiow-Lih Wu, No. 15, Alley 12, Lane 179, Yungming St., Yungkang City, Tainan Hsien (TW)

( * ) Notice: Subject to any disclaimer, the term of this patent is extended or adjusted under 35 U.S.C. 154(b) by 38 days.

(21) Appl. No.: 10/359,118

(22) Filed: Feb. 6, 2003

(51) Int. Cl.[7] .............................. A47G 1/24; B60R 1/02
(52) U.S. Cl. ........................ 248/480; 248/479; 248/485; 248/486
(58) Field of Search ................................. 248/479, 480, 248/485, 486, 278.1, 285.1, 286.1, 292.14, 425, 476, 474, 471

(56) References Cited

U.S. PATENT DOCUMENTS

| | | | | |
|---|---|---|---|---|
| 1,178,072 A | * | 4/1916 | Hoag | 359/602 |
| 1,428,042 A | * | 9/1922 | Hodny | 248/480 |
| 3,394,979 A | * | 7/1968 | Wilson | 359/844 |
| 3,433,448 A | * | 3/1969 | Weber | 248/476 |
| 3,709,585 A | * | 1/1973 | Tsai | 359/860 |
| 4,991,814 A | * | 2/1991 | Schmidt et al. | 248/479 |
| 6,036,160 A | * | 3/2000 | Shimokobe et al. | 248/483 |
| 6,485,151 B2 | * | 11/2002 | Coleburn | 359/842 |

\* cited by examiner

*Primary Examiner*—Ramon O. Ramirez
*Assistant Examiner*—Amy J. Sterling
(74) *Attorney, Agent, or Firm*—Birch, Stewart, Kolasch & Birch, LLP

(57) ABSTRACT

An improved rearview mirror structure mainly includes a support bar, a mirror frame and an anchor post. The support bar has a chute formed on a front end and at least one anchor rack on a rear end. The mirror frame has a sliding strut housed in the chute. The anchor rack is coupled on the anchor support and may be anchored thereon by turning a first adjust bolt. The mirror frame is anchored and adjustable upwards and downwards, and to the left and the right to reach a desired elevation. Thus the rearview scope may be expanded without producing any dead angle to achieve driving safety.

3 Claims, 6 Drawing Sheets

REARVIEW MIRROR STRUCTURE

FIELD OF THE INVENTION

The present invention relates to a rearview mirror structure and particularly to a rearview mirror structure that has a mirror frame with adjustable elevations for up and down and left and right to expand the review scope and achieve driving safety.

BACKGROUND OF THE INVENTION

The commonly used rearview mirrors at present generally are constructed like the one shown in FIG. 1. It mainly has a mirror frame with a mirror pivotally mounted thereon. The mirror frame has a lower end coupled to an anchor post. The anchor post has screw threads to engage with one side of the motorcycle handgrip. Such a construction is not very satisfactory in practice. As the mirror frame can only be moved on the anchor post along an arched track, it cannot be adjusted and moved in the up and down, or left and right directions. The adjustment range is limited. Rearview scope is hindered. There are viewing dead angles and dangers are prone to happen during driving.

SUMMARY OF THE INVENTION

In view of the aforesaid disadvantages, the primary object of the invention is to provide an improved rearview mirror structure that is constructed with simple components, is easy to assemble and replace and adaptable to various types of vehicles, can reduce cost and may be adjusted easily to different up and down and left and right elevations to expand the rearview scope and enhance driving safety.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
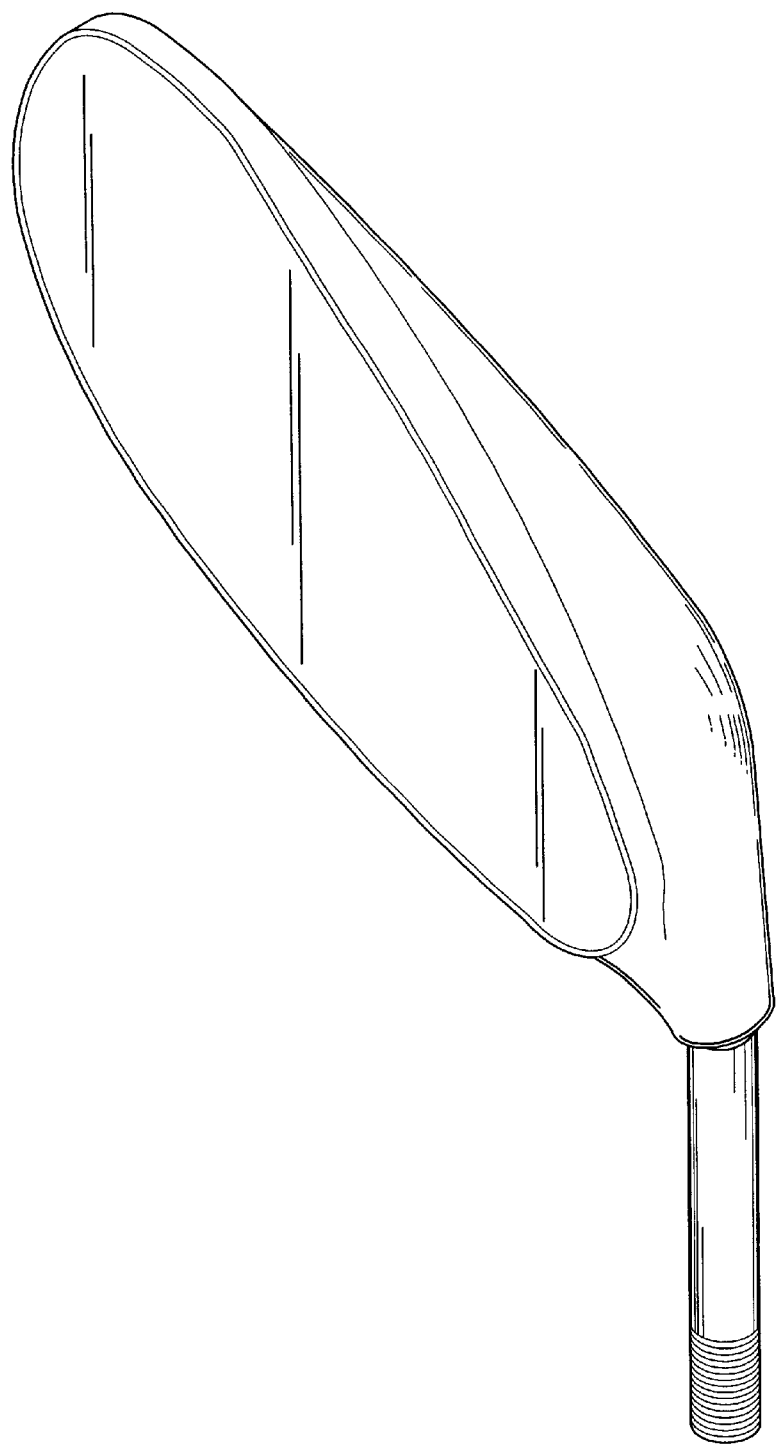
FIG. 1 is a schematic view of a conventional rearview mirror.
Figure 2:
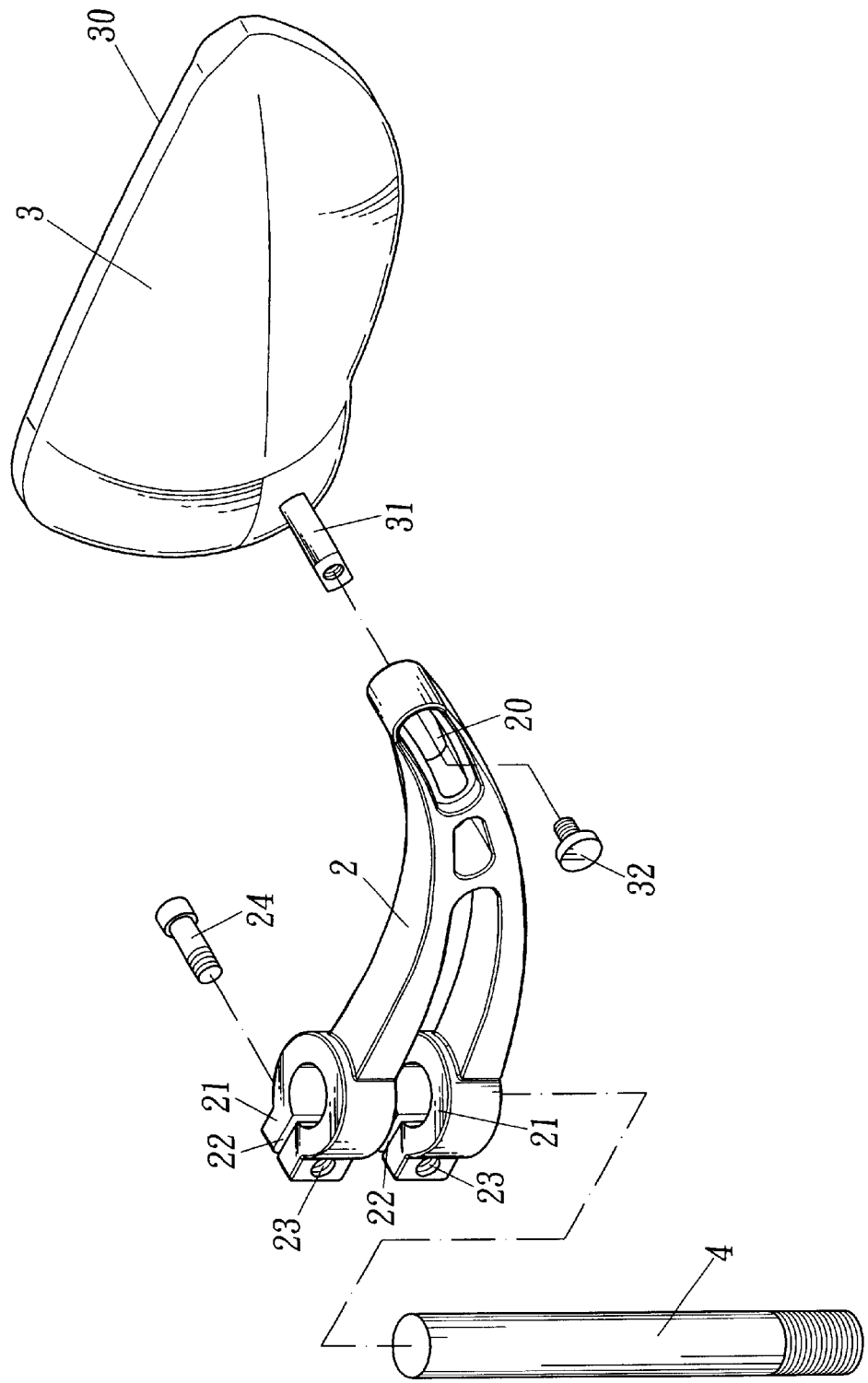
FIG. 2 is an exploded view of the invention.

Referring to FIG. 2, the invention mainly includes a support bar 2 formed in Y-shape. The support bar 2 has a front end with a chute 20 formed therein and a rear end which has two round anchor racks 21. The two anchor racks 21 have respectively a slot 22. Each anchor rack has two screw holes 23 formed across the slot 22 corresponding to each other for engaging with a first adjusting bolt 24. A mirror frame 3 is provided to slide in the chute 20 of the support bar 2. The mirror frame 3 has a mirror 30 mounted thereon. The lower section of the mirror frame 3 has a sliding strut 31 matching the chute 20 of the support bar 2. The sliding strut 31 is engaged with a second adjusting screw 32. An anchor post 4 is provided to allow the two anchor racks 21 of the support bar 2 to movably mount thereon. The anchor post 4 has a distal end anchoring on a desired location of the handgrip of a motorcycle.

Figure 3:
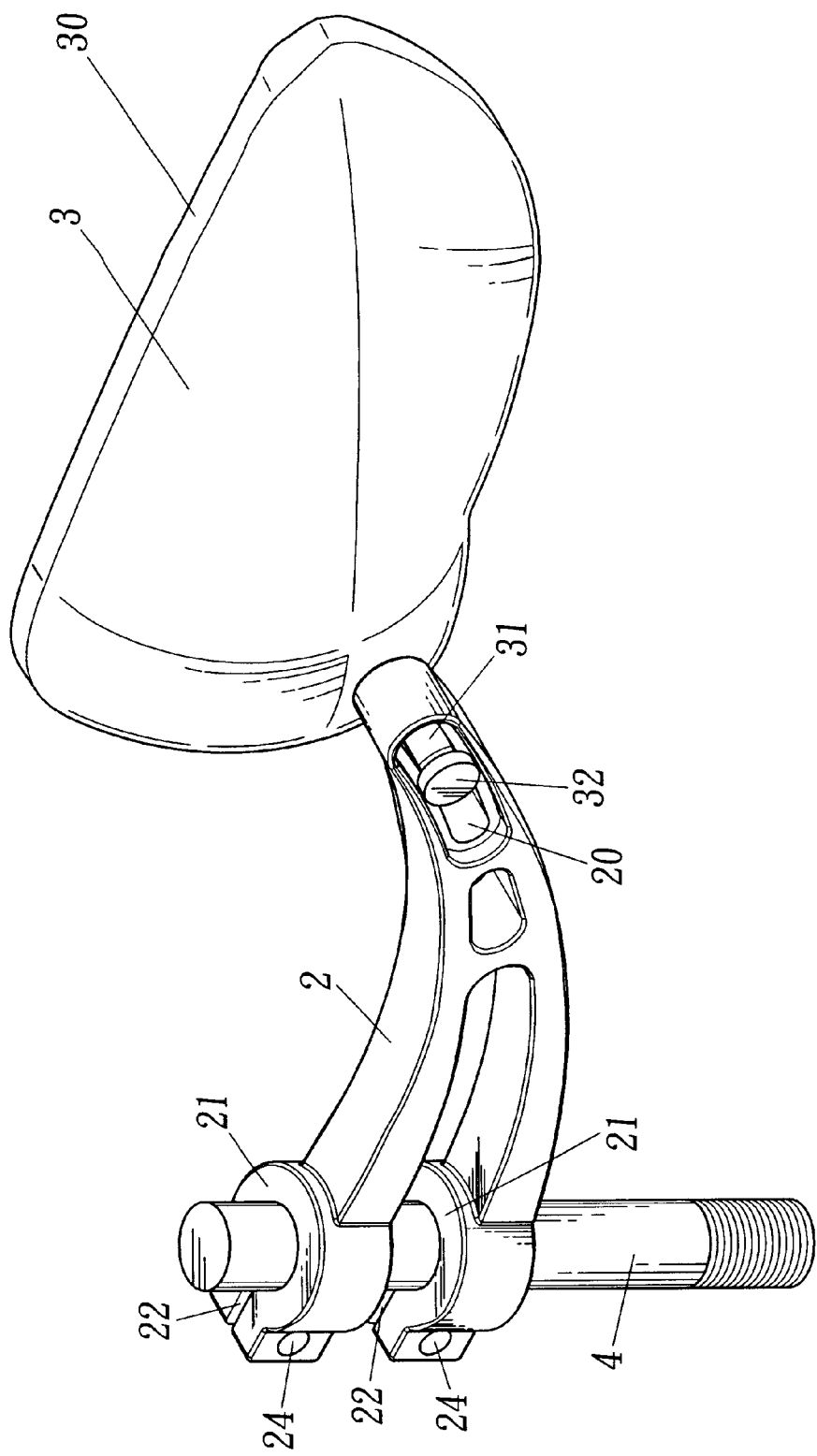
FIG. 3 is a perspective view of the invention.
Figure 4:
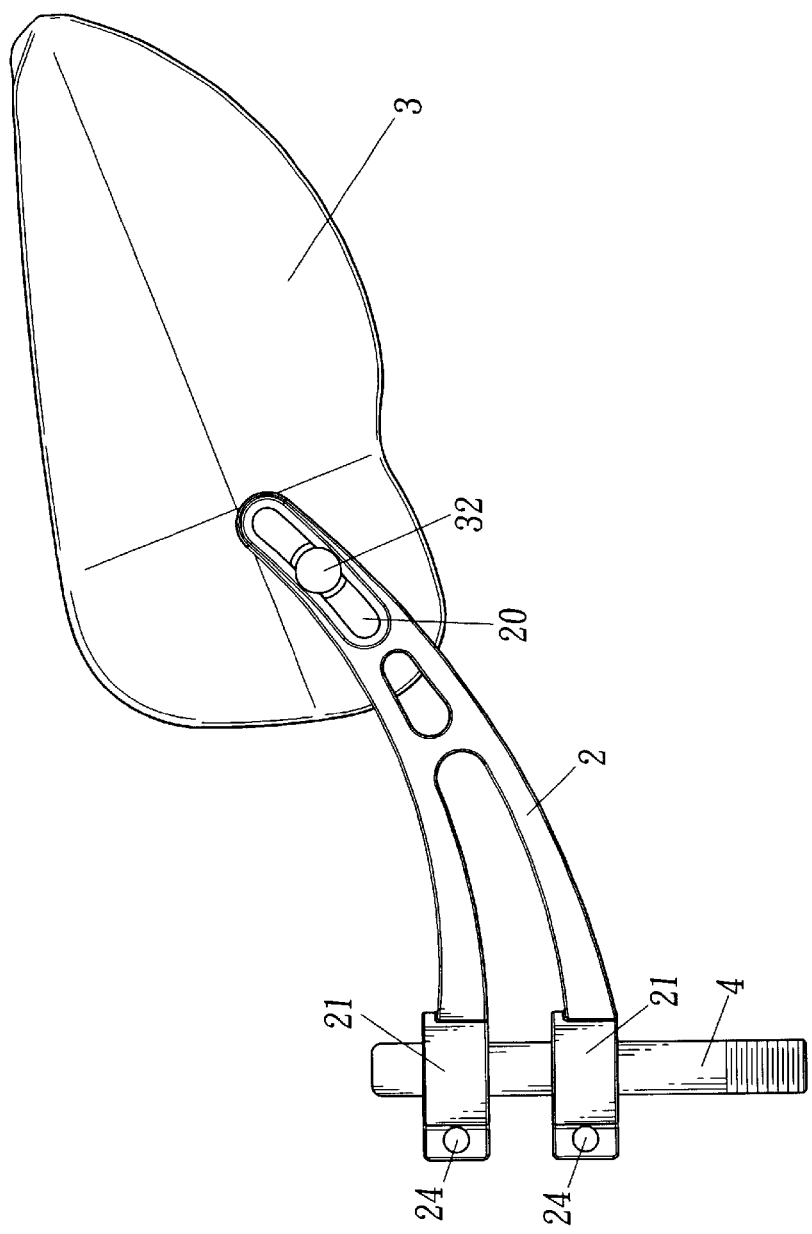
FIG. 4 is a perspective view of the invention in use.

Referring to FIGS. 3 and 4, for assembly, first, insert the sliding strut 31 on the lower side of the mirror frame 3 into the chute 20 on the front end of the support bar 2, and fasten the second adjusting bolt 32 to the sliding strut 31 to allow the sliding strut 31 movable in the chute 20 without escaping; then couple the two anchor racks 21 on the anchor post 4 and tighten the first adjusting bolt 24 to squeeze the slot 22 to firmly anchor the support bar 2 on the anchor post 4 to complete the assembly.

Figure 5:
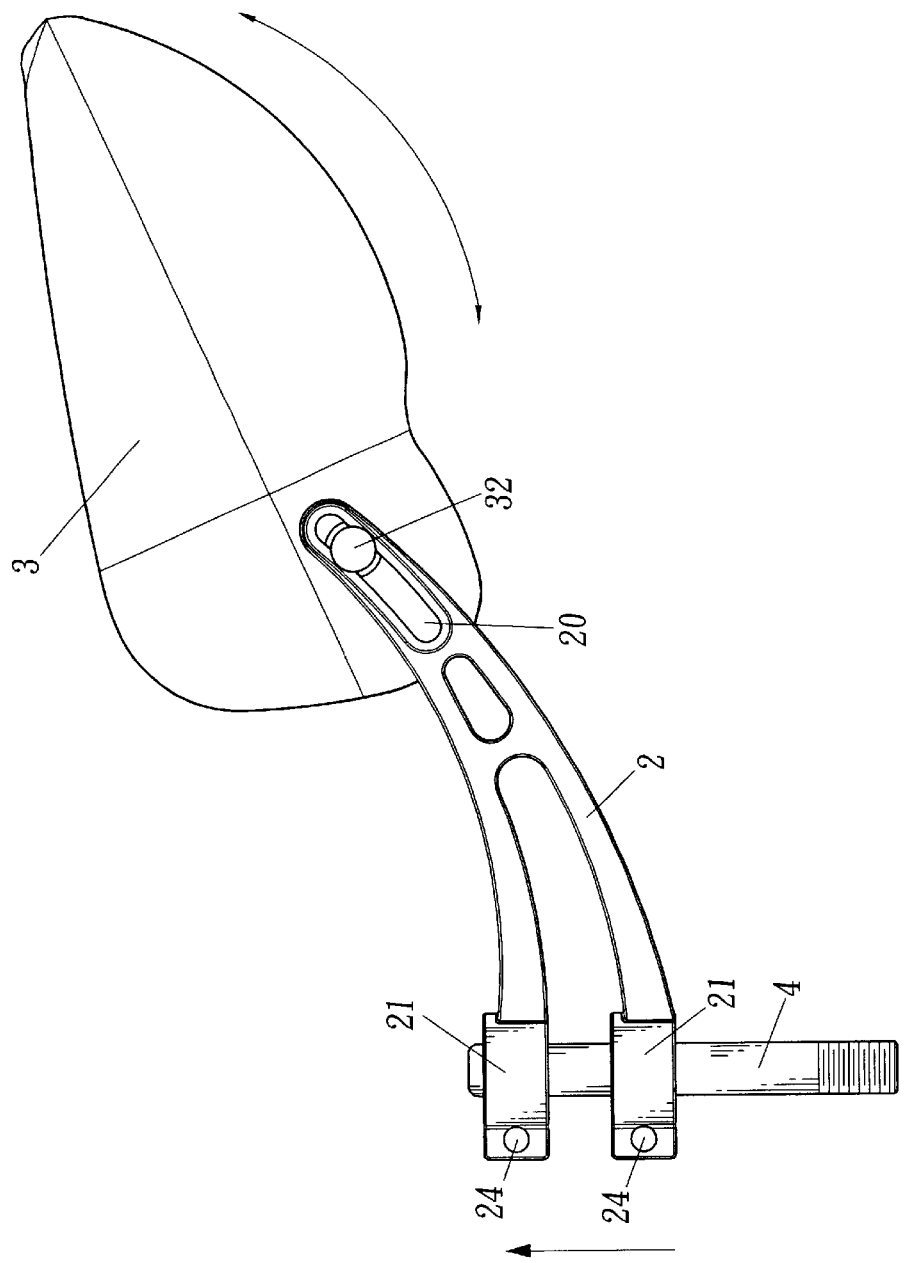
FIG. 5 is a schematic view of the invention for adjusting the mirror frame to the left or right.
Figure 6:
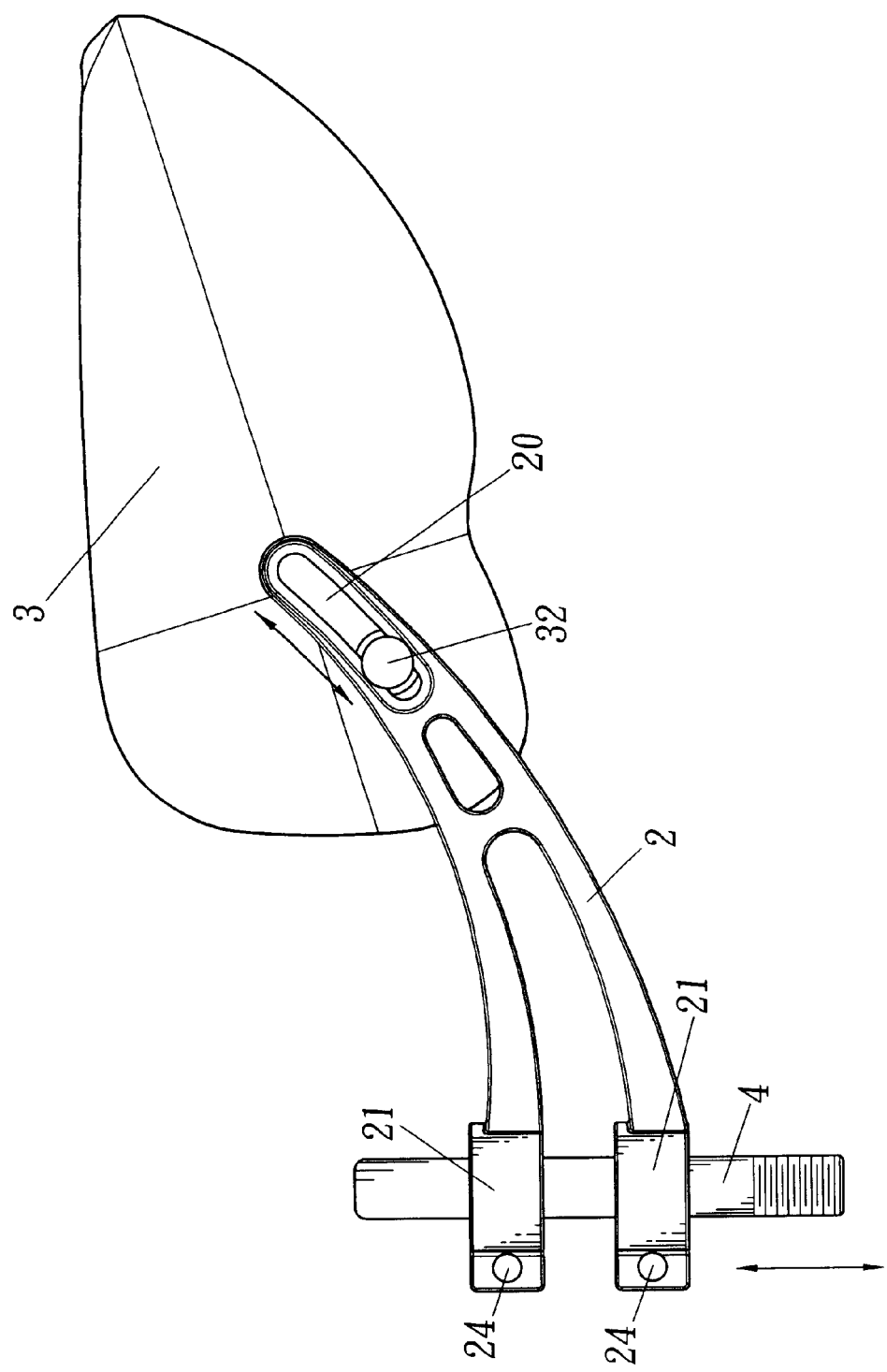
FIG. 6 is a schematic view of the invention for adjusting the mirror frame upwards or downwards.

Referring to FIGS. 5 and 6, when in use, fasten the distal end of the anchor post 4 to a desired location of the handgrip of the motorcycle. When there is a desire to adjust the left and right position of the mirror frame 3, unfasten the second adjusting bolt 32 and move the mirror frame 3 to enable the sliding strut 31 moving in the chute 20 to the desired location, then fasten the second adjusting bolt 32 tightly. When there is a desire to adjust the mirror frame 3 upwards or downwards, unfasten the first adjusting bolt 24 to release the slot 22; next, move the mirror frame 3 to a desired elevation; then tighten the first adjusting bolt 24 on the anchor rack 21 to compress the slot 22 to mount on the anchor post 4 firmly with the mirror frame 3 positioned on the desired location.

By means of the aforesaid construction, the invention can achieve the following advantages:

1. The invention can easily adjust the mirror frame to a desired elevation up and down and left and right to expand the rearview scope without producing any dead angle. Thus driving safety may improve.
2. The invention consists of simple components, and is convenient to assemble and install. Replacement is easy in the event of damage without the need of replacing the entire set. It is adaptable to various types of vehicles and may save cost.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A rearview mirror structure, comprising:
   a support bar having a chute located on a front end and at least one anchor rack located on a rear end thereof, the anchor rack having a slot;
   a mirror frame engaged with the chute of the support bar having a mirror and a sliding strut connecting to a lower side thereof; and
   an anchor post to allow the anchor rack to movably mount thereon having a distal end anchoring on a handgrip of a motorcycle;
   wherein the anchor rack on the rear end of the anchor bar is anchored by turning a first adjusting bolt, the mirror frame being anchored and adjustable upwards and downwards and to the left and the right to reach a desired elevation to expand rearview scope.

2. The rearview mirror structure of claim 1, wherein the anchor rack has screw holes across the slot corresponding to each other to engage with the first adjusting bolt.

3. The rearview mirror structure of claim 1, wherein the sliding strut is engaged with a second adjusting bolt.

* * * * *